United States Patent [19]
de Jong

[11] 3,945,476
[45] Mar. 23, 1976

[54] MOTOR CONSTRUCTION
[75] Inventor: Wilhelmus Maria de Jong, Amsterdam, Netherlands
[73] Assignee: Quick-Rotan Becker & Notz KG, Darmstadt, Germany
[22] Filed: Apr. 25, 1974
[21] Appl. No.: 464,111

[30] Foreign Application Priority Data
Apr. 30, 1973 Switzerland................ 6183/73

[52] U.S. Cl............ 192/12 D; 192/18 B; 192/113 A
[51] Int. Cl.² B60K 41/24; F16D 13/22; F16D 13/60
[58] Field of Search............ 192/12 D, 18 B, 113 A, 192/113 R, 48.2, 84 AA

[56] References Cited
UNITED STATES PATENTS

| | | | |
|---|---|---|---|
| 2,659,830 | 11/1953 | Mason et al.............. | 192/18 B |
| 2,853,165 | 9/1958 | Walter et al.............. | 192/18 B |
| 3,254,746 | 6/1966 | Myers...................... | 192/18 B X |
| 3,581,855 | 6/1971 | Taeffner et al........... | 192/18 B |
| 3,724,619 | 4/1973 | Miller...................... | 192/18 B |
| 3,777,864 | 12/1973 | Marti....................... | 192/18 B |

Primary Examiner—Benjamin W. Wyche
Assistant Examiner—Lance W. Chandler
Attorney, Agent, or Firm—Michael J. Striker

[57] ABSTRACT

A stator is mounted in a housing, and a rotor is rotatable with reference to the stator and rotates with a motor shaft. A flywheel is mounted on and rotatable with the motor shaft. An output shaft is separate from the motor shaft and a stationary member is mounted in the housing and surrounds the output shaft with clearance. A coupling plate and a braking plate are both mounted on the output shaft for rotation therewith, being located axially adjacent the flywheel and the stationary member, respectively. A first electromagnet is associated with the coupling plate and when energized causes frictional engagement of the latter with the flywheel so that the coupling plate and thereby the output shaft are entrained in rotation by the flywheel. A second electromagnet is associated with the braking plate and when energized causes frictional engagement thereof with the stationary member so that the braking plate and the output shaft are braked by frictional engagement therewith. The electromagnets are radially spaced and define with one another an airgap, and components are provided which produce an airflow through the housing, including through the airgap between the two electromagnets.

24 Claims, 5 Drawing Figures

MOTOR CONSTRUCTION

BACKGROUND OF THE INVENTION

The present invention relates generally to a motor construction, and more particularly to a motor construction having a motor shaft and an output shaft which can be selectively coupled with the motor shaft to be driven by the same, and can be braked.

It is known from the prior art to provide motor constructions of this type, for instance from U.S. Pat. No. 3,581,855 and from German Pat. No. 2,155,423. This type of motor construction has the advantage that the friction surfaces of the coupling plate and of the braking plate which are required can be relatively large in their dimensions, and therefore be effective, whereas the axial space required for the overall construction is relatively small, which is of course desirable.

An additional advantage of these constructions is the fact that short magnetic paths are obtained and this, in conjunction with the small airgaps required, assures that a rapidly responding magnetic system is obtained which, nevertheless, requires only a relatively small amount of electric energy. Constructions of this type are characterized by the fact that relatively short mechanical dead time exists, which is important in order to obtain a rapid accommodation of the regulating value in motors whose rotational speed is regulated. Moreover, the small regulating time required in these constructions makes possible a precise positioning.

However, for all their advantages the prior-art constructions are still possessed of certain disadvantages which must be overcome. In motor constructions of this type heat is developed not only by operation of the electromagnets, but much heat is in aaddition produced by friction since the rotational speed of the motor is controlled via the slip between the motor flywheel and the coupling plate, by intermittent operation of the coupling and the brake, or by simultaneous operation of the coupling and the brake in mutually opposite sense, that is energizaation of the brake and deenergization of the coupling, or vice versa. In addition, when the output shaft is braked further high heat values develop for at least brief periods of time, because the entire kinetic energy in the system becomes converted into heat. It is quite evident that the development of so much heat is undesirable and should be suppressed to the extent possible, especially since the friction members of the coupling plate and of the braking plate are in effect the only wear parts of the system and since their degree of wear is a function of the heat which acts upon them, so that a reduction of the heat will result in an increase of the lifetime of these components.

SUMMARY OF THE INVENTION

Accordingly, it is an object of the invention to provide an improved motor construction of the type under discussion, wherein the development of the aforementioned heat is effectively counteracted by improved cooling.

More particularly, it is an object of the present invention to provide such an improved motor construction wherein, due to the improved cooling and the thus obtained reduction in the heat the mechanical forces which can be transmitted from the motor shaft to the output shaft can be increased while yet obtaining extremely short starting times and braking times.

In keeping with the above objects, and with others which will become apparent hereafter, one feature of the invention resides, in a motor, in a combination which comprises housing means, a stator mounted in said housing means, a rotor rotatable with reference to said stator, and a motor shaft rotatable with the rotor. A flywheel is mounted on and rotatable with the motor shaft. An output shaft is separate from the motor shaft and a stationary member is mounted in the housing means anad surrounds the output shaft with clearance. A coupling plate is mounted on the output shaft axially adjacent the flywheel, and a braking plate is mounted on the output shaft axially adjacent the stationary member. A first electromagnet is associated with the coupling plate and is energizable for effecting frictional engagement thereof with the flywheel so as to be entrained by the latter. A second electromagnet is associated with the braking plate and energizable for effecting frictional engagement thereof with the stationary member so as to be braked by the same, the electromagnets being radially spaced and defining with one another an airgap. Airflow-producing means is provided for producing a flow of air through the housing means, including through the airgap between the electromagnets.

We have found that with this construction the cooling air can be so guided that it will come to the immediate vicinity of the regions where the heat develops in operation, and will thus be much more effective than was previously the case.

In fact, the cooling effect can be further improved if the electromagnets are additionally offset axially with reference to one another, defining additional spaces through which the cooling air can also be made to circulate.

It is advantageous if the two electromagnets are united to form a unit with a stationary component which is fixedly mounted in the housing, and which may be the stationary member mentioned earlier. The stationary member itself may be located in the annular space defined by the housing means with the coupling plate and the axially spaced braking plate, so that the stationary member also is subjected to the cooling action of the flow of cooling air.

According to one construction of the invention, which provides highly effective cooling, and which particularly assures that the cooling air will essentially come into contact with all parts of those components which are primarily responsible for the generation of heat in operation of the device, provides for the cooling air stream which is aspirated into the housing means to flow radially inwardly behind the stationary member, thereupon in axial direction of the device between the two electromagnets, finally further radially inwardly behind the coupling plate, then in axial direction through the coupling plate itself which for this purpose is apertured, and finally behind that portion of the flywheel which is engageable with the coupling plate in radially outward direction, to be vented from the housing means. Such an airflow path provides for excellent cooling results.

The stationary member which cooperates with the braking plate need not be stationarily mounted in the housing means, however, but could instead also be turnable about an axis coinciding with that of the output shaft. This is known from the prpior art, namely from the aforementioned German Pat. No. 2,155,423. For this reason this member will hereafter be called the braking member, to indicate that it could be either fixedly mounted or turnably, as outlined above.

The braking member can be fixedly connected to an outer bearing plate or shield, and if it is connected with the two electromagnets to form an assembly unit with the same, it is advantageous if this assembly unit is supported via a bearing on the output shaft, and vice versa. This is a particularly simple, easy to mount and yet especially stable arrangement.

The bearing can be supported on fins of the unit composed of the electromagnet and the braking member, which fins extend inwardly of the opening through which the output shaft extends, and/or it can be seated on the output shaft, in order to permit a second cooling airstream to be passed through the radially inner portion of the coupling and braking arrangement of the motor.

The electromagnets are advantageously connected with a carrier body by shrink fitting, which offers the dual advantage of affording high mechanical strength and a particularly effective heat transfer between the electromagnets and the carrier body which thus acts as a heat sink.

The arrangement of the braking member, particularly if the same is located between the coupling plate and the braking plate, makes it possible to provide the braking plate at the axial side facing away from the braking member with air vanes which produce still another cooling airflow and thus further enhance the cooling effectiveness of the arrangement.

The flywheel will advantageously be formed at its side facing towards the coupling plate with a ring of magnetically conductive material which is seated upon fins of the flywheel which define airgaps for passage of the cooling airstream between them. This has the aadvantage that the major part of the flywheel can be constructed as an inexpensive casting, and that at the same time the cooling airstream can be guided very closely to the location where frictional heat develops from contact between the flywheel and the coupling plate.

An impeller may be mounted on the motor shaft, preferably at the end which is remote from the flywheel, and this impeller produces an aadditional airstream which can be so guided that it sweeps over the inlet and outlet openings through which the airstream that is guided between the electromagnets, enters and leaves the housing means. This protects these inlet and outlet openings against the entry of dust and other contaminants.

The coupling plate and the braking plate may each be provided with a hub mounted on the output shaft, a radially outwardly located magnetically conductive armature ring, and springy members which permit the flow of cooling air through them, for instance slotted or otherwise apertured annuli of springy material, which connect the hub with the respective armature ring. The use of these springy members produces a bistable action of both the coupling plate and the braking plate, so that after the electrical energy supplied to the respectively associated electromagnet is cut off, the coupling plate or the braking plate will immediately snap back to a precisely defined rest position under the influence of the restoring force exerted by its associated springy annular member.

It is advantageous if the armataure rings themselves are surrounded by support bodies of a light metal (e.g. aluminum, magnesium and the alloys thereof, such as Electron, or the like) or an appropriate synthetic plastic material (e.g. Novotex or Macrolon). This affords a large friction surface, because the friction members which can be carried on the support bodies can have large friction surfaces, and it provides a correspondingly decreased stress per unit of surface area and similarly reduced wear, while at the same time the moment of inertia of both the coupling plate and the braking plate can be held to a low value with such a construction. This in turn is of importance in order to obtain rapid switching times, that is rapid energization and deenergization times.

The support bodies can be shrink-fitted onto the armature rings, and it is advantageous if the support body of the coupling plate is in turn surrounded by a ring of magnetically conductive material. The armature ring of the coupling plate and the ring of magnetically conductive material which surrounds the support body of the armature ring can then be so constructed that the magnetic flux or field produced upon energization of the associated electromagnet will be divided into three field portions. Two annular friction members which are concentric with one another can be located between the respective magnetic field portions so that the field is divided into three annular field portions. This subdivision of the magnetic flux field has the advantage that the friction members will be uniformly pressed against the flywheel and the danger of yielding of the coupling plate will be reduced.

In addition it is advantageous if, according to a further concept of the invention, the output shaft is axially displaceable to a limited extent with reference to the housing means. In combination with the fact that the braking member is advantageously located in the space between or intermediate the coupling plate and the braking plate, this assures that the axial airgap between the coupling plate and the flywheel as well as the axial gap between the braking plate and the braking member can be adjusted jointly, that is in unison. A readjustment of these airgaps after partial wear of the friction members is thereby simplified to a great extent. It is also advantageous if in addition the motor shaft is axially adjustable with reference to the housing means, because this affords the possibility of separately adjusting the airgap between thhe flywheel and the coupling plate, especially for purposes of initial adjustment, without at the same time having to also adjust the airgap between the braking member and the braking plate. The respectivve shafts can be axially adjusted by providing threaded sleeves which each engage one end portion of the respective shaft and are each threaded into a bearing plate associated with the respective shaft, their turning movement being transmitted axially to the respective shaft to thereby shift the same.

Finally, it is also advantageous if, in order to reduce the wear at the friction members, the side of the flywheel and/or of the braking member which is juxtaposed with the coupling plate and the braking plate, respectively, is advantageously provided with at least one axially projecting portion of a synthetic plastic material having self-lubricating characteristics, and which contacts the coupling plate or braking plate, respectively, in operation of the device.

The novel features which are considered as characteristic for the invention are set forth in particular in the appended claims. The invention itself, however, both as to its construction and its method of operation, together with additional objects and advantages thereof, will be best understood from the following description of specific embodiments when reaad in connection with the accompanying drawing.

DESCRIPTION OF THE PREFERRED EMBODIMENTS

Referring firstly to the embodiment illustrated in FIGS. 1–4, it will be seen that the motor construction shown therein has a stator 1 and a rotor 2; the latter is connected to and rotates with a motor shaft 3 which turns in operation of the motor at a constant speed, for instance at 3,000 rotations per minute. The motor shaft 3 is journalled in bearings 4, 5 and at its end which is the left-hand end in FIG. 1 it carries an impeller 6.

The bearing 4 journalling the motor 3 is mounted in a bearing plate or bearing shield 7, which latter has a tapped bore into which an exteriorly threaded sleeve 8l is screwed. The sleeve 8 surrounds and is concentric with the motor shaft 3 and bears against the outer race of the antifriction bearing 4. An expansion spring 9 bears upon the outer ring of the antifriction bearing 5 and, since the latter bears upon a shoulder of the motor shaft 3, the spring 9 exerts a biasing force upon the motor shaft 3 in the left-hand direction in FIG. 1.

Figure 1:
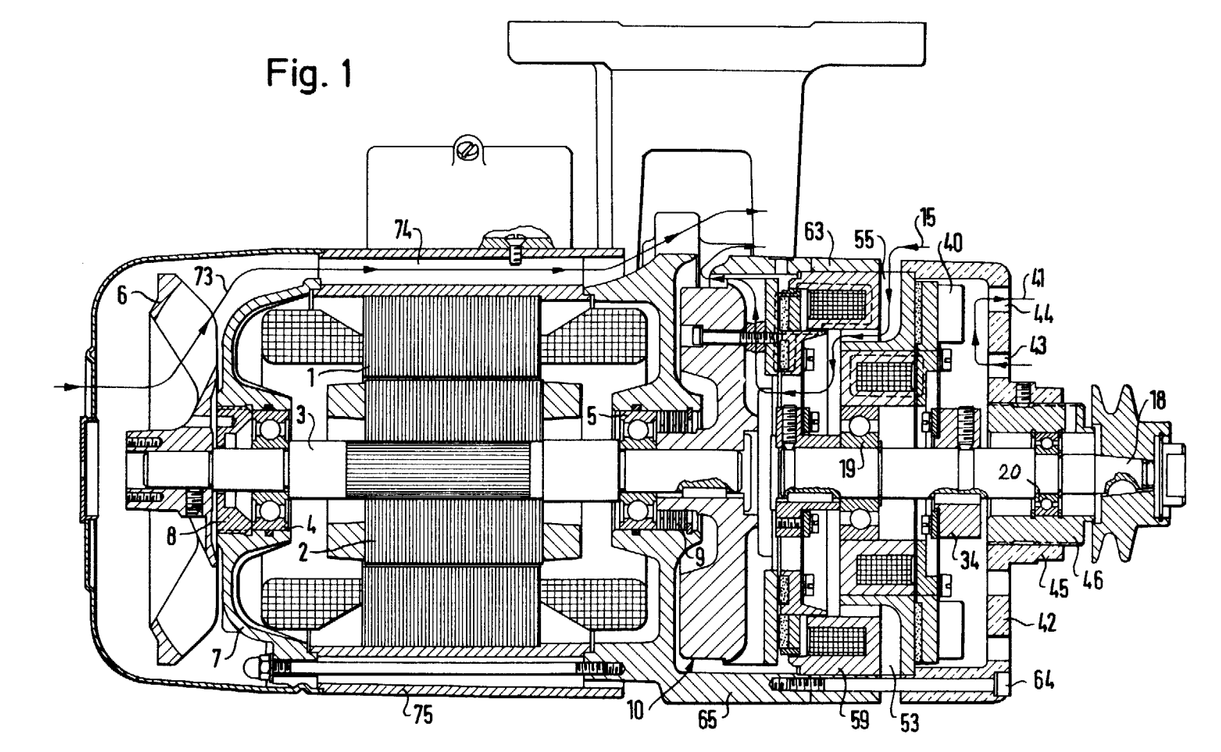
FIG. 1 is an axial section through a motor according to the present invention.
Figure 2:
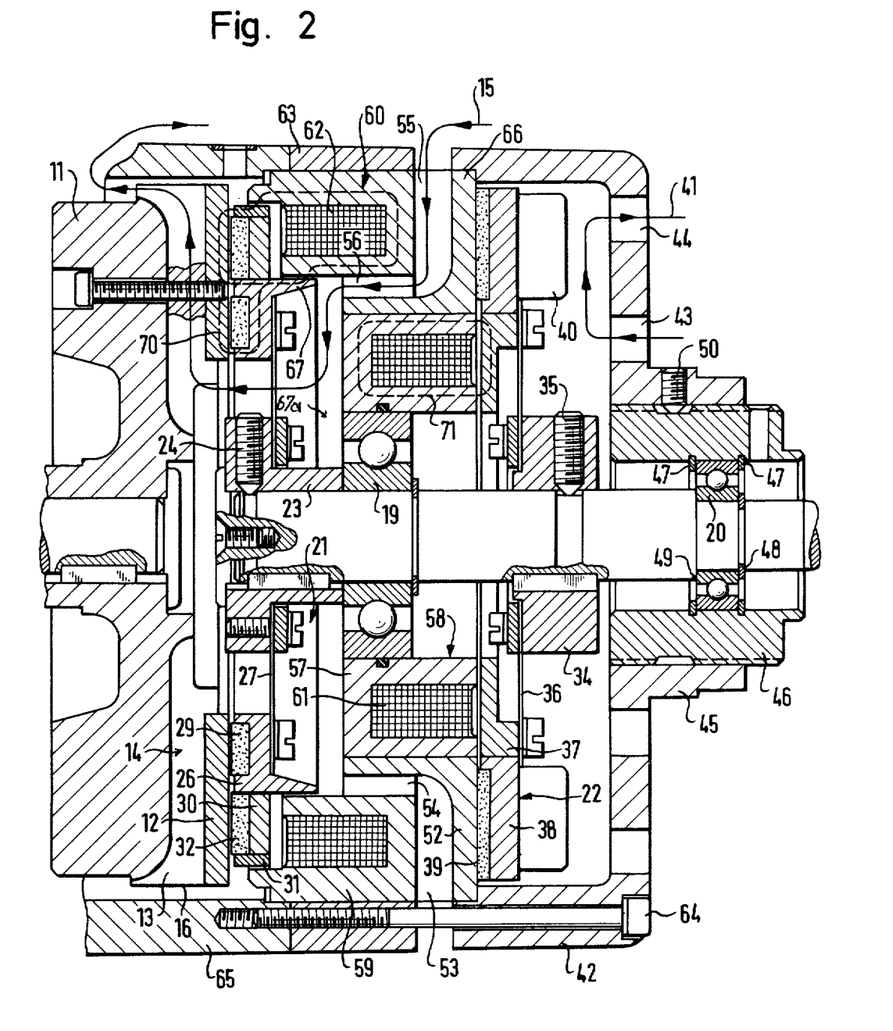
FIG. 2 is aan enlarged fragmentary detail view, again in axial section, of the motor shown in FIG. 1.

The opposite end of the motor shaft 3, that is the end remote from the impeller 6, carries a flywheel 10 which rotates with the motor shaft and, as shown particularly in FIG. 2, has a main body portion 11 which may be in form of a casting, and a ring 12 which is of magnetically conductive material. The ring 12 is mounted on fins 13 of the body 11 at that axial side which faces away from the impeller 6. The fins 13 define between one another air slots 14 through which a stream of cooling air 15 can travel. Other radially outer end portions 16 of the fins 13 serve to aspirate the cooling airstream 15.

In addition to the motor shaft 13 the construction in FIGS. 1–4 has an output shaft 18 which is journalled for rotation in antifriction bearings 19 and 20. Mounted on the output shaft 18 for rotation with the same is a coupling plate 21 and an axially spaced braking plate 22. The coupling plate 21 is provided with a hub 23 which is mounted on that end of the output shaft 18 which is adjacent the flywheel 10 and which is fixed against positional displacement by means of a set screw 24. An armature ring 26 of magnetically conductive material (e.g. iron, cast steel, ferrite or the like) surrounds the hub 23 coaxially and is connected with the same via a spring ring 27, for instance of steel or the like which is provided with approrpriate openings --such as slots, holes or the like-- in the space intermediate the outer surface of the hub 23 and the inner edge of the armature ring 26, so that air can pass through it, namely the stream 15. The openings are not shown to avoid confusion, but will be readily understood as to their location.

At its axial end facing the flywheel 10 the armature ring 26 is provided with an annular groove in which a friction member 29 is mounted. A support ring 30 --for instance of aluminum or another light-weight metal, or of synthetic plastic material-- is shrink-fitted onto the armature ring 26, and shrink-fitted onto the support ring 30 is a ring 31 of magnetically conductive material. The ring 26, the ring 30 and the ring 31 form at the axial end facing towards the flywheel 10 a further annular groove into which an additional friction member 32 is inserted which is concentric with respect to the friction member 29 and is flush with the same in axial direction, so that their exposed surfaces are located in a common plane transverse to the longitudinal axis of the output shaft 18.

The braking plate 22 is constructed analogously to the coupling plate 21. It is formed with a hub 34 which is mounted on the output shaft 18 and prevented against positional displacement by means of a set screw 35. An armature ring 37 of magnetically conductive material surrounds the hub 34 and is connected with the same by a spring ring 36 which is again apertured to permit airflow therethrough. A supporting ring 38, preferably of aluminum, another light-weight metal or synthetic plastic material, is shrink-fitted about the armature ring 37 and carries at its axiala face which is directed towards the flywheel 10 a friction member 39. At the opposite axial end the supporting ring 38 is formed with an annulus of impeller vanes 40 which in rotation produce a cooling airstream 41 which enters via openings 43 of a bearing plate or shield 42, and leaves via openings 44 in the same plate 42. The latter is provided with a hub 45 into which a threaded sleeve 46 is screwed, which in turn mounts the antifriction bearing 20. Spring rings 47 maintain the bearing 20 in the sleeve 46 against axial displacement. A further spring ring 48 holds the bearing 20 in engagement with a shoulder 49 of the output shaft 18. A set screw 50 permits the sleeve 46 to be arrested against displacement with reference to the plate 42.

Figure 3:
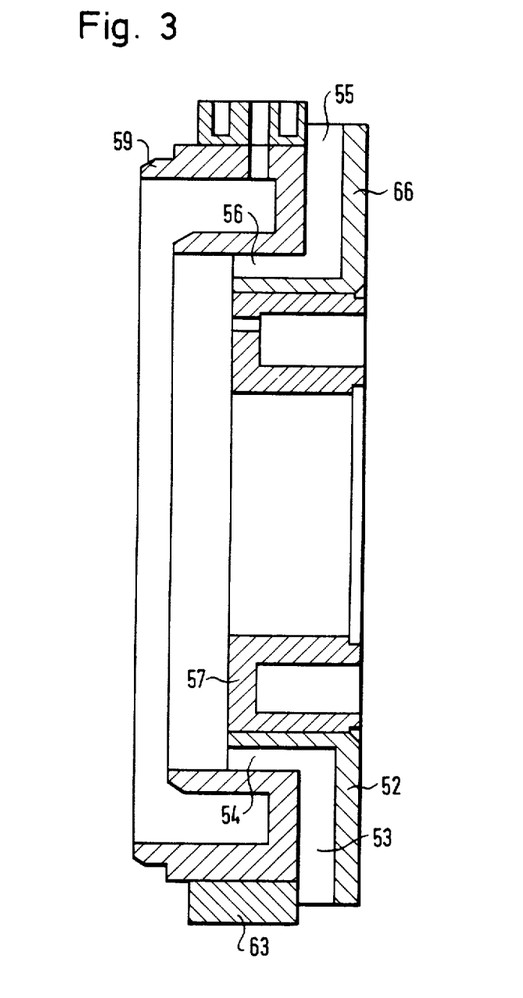
FIG. 3 is a fragmentary axial section through a detail of FIGS. 1 and 2, illustrating the assembly unit composed of the housings of the electromagnets and the braking member.
Figure 4:
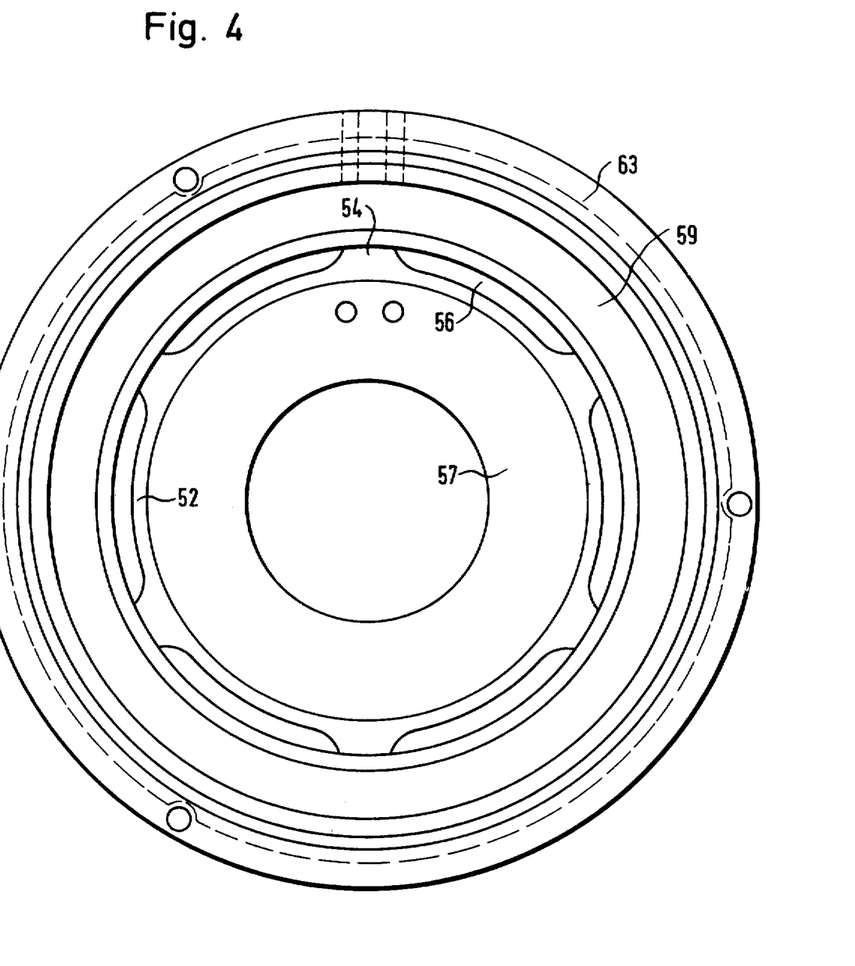
FIG. 4 is an end view of FIG. 3, looking towards the right in that Figure.

A carrier body 52 is mounted on that side of the bearing plate 42 which faces towards the flywheel 10; it is provided with radial fins 53 and axial fins 54 (compare FIGS. 3 and 4) which form between themselves passages 55, 56 for the cooling airstream 15. The housing 57 of the electromagnet 58 serving to provide the braking action is shrink-fitted in the body 52. The housing 59 of the electromagnet 60 serving to produce the coupling action is shrink-fitted onto the fins 53. The housings 57 and 59 each accommodate the coils 61 and 62, respectively, of the two electromagnets. A mounting ring 63 is mounted on the housing 59, and the carrier body 52, the housings 57, 59 and the ring 63 constitute in assembled condition an assembly unit as shown in FIGS. 3 and 4, which is connected --together with the bearing plate 42-- with a housing portion 65 by means of screws 64, and in which the antifriction bearing 19 is mounted. The portion of the axial end of the mounting body 52 which is located opposite the friction member 39 of the braking plate 22, constitutes a fixed brake component, namely a braking member 66. An axial projection 67 of the armature ring 26 extends into the magnet housing 59, forming a radial airgap 67a.

The operation of the embodiment in FIGS. 1–4 is as follows:

When neither of the windings 61, 62 of the electromagnets 58, 60 is energized, airgaps of for instance several tenths of a millimeter width in axial direction (i.e. in direction axially of the shafts 3, 18) exist between the friction members 29, 32 of the coupling plate 21 and the flywheel ring 12, and also between the friction member 39 of the braking plate 22 and the braking member 66. The spring rings 27 and 36 maintain the plates 21, 22 in specifically defined rest positions. The motor shaft 3 and the flywheel 10 rotate if the motor is energized, and the output shaft 18 is stationary at this time.

If, now, the winding 62 is energized, then the magnetic flux will develop whose circuit is shown at 70 in FIG. 2 and which is subdivided during its passage through the coupling plate 21 into three concentric field components whosse tendency is to reduce the airgap between the friction members 29, 32 of the coupling plate 21 and the flywheel ring 12 of the flywheel 10, due to magnetic attraction. This causes the coupling plate 21 with its friction members 29, 32 to be pressed against the ring 12 which rotates with the body 11 of the flywheel 10, so that the coupling plate 21 is entrained in rotation by the flywheel 10 and, being fixedly connected with the output shaft 18, in turn drives the output shaft.

If subsequently the output shaft is to be braked, then the winding 61 will be energized and the winding 62 deenergized, with the result that a magnetic flux field 71 develops (see FIG. 2) which causes the braking plate 22 to be pressed against the braking member 66, so that the latter contacts the friction member 39. This develops friction between the braking member 66 and the braking plate 22, and since the latter is fixedly connected with the output shaft 18, the rotation of the output shaft is braked.

The flywheel 10 rotates constantly and aspirates the cooling airstream 15 which enters through the openings 55, 56 and travels through the unit formed by the body 52 and the magnet housings 57, 59. To do so, it first flows radially inwardly, thereupon between the magnet housings 57, 59 in direction towards the coupling plate 21, and subsequently further radially inwardly towards the output shaft 18 between the juxtaposed end faces of the coupling plate 21 and the magnet housing 59. The airstream 15 then passes through the spring ring 27 and the annular space between the hub 23 and the armature ring 27, to enter into the air slots 14 and subsequently to leave the housing, upon exit from which it is deflected by the housing portion 65.

As long as the output shaft 18 rotates, the vanes 40 of the brake plate 22 additionally aspirate a cooling airstream 41 which travels through the space between the braking plate 22 and the inner surface of the bearing plate 42. Yet an additional airstream 73 (see FIG. 1) is produced by the impeller 6 which is mounted on the constantly rotating motor shaft 3, and this airstream 73 travels in direction towards the flywheel 10 through axial channels 74 of a motor housing portion 75, and is so guided when it exits from the motor housing that it sweeps over the inlet and outlet openings for the cooling airstream 15, to protect these openings against contaminants, especially against the entry of dust or the like (see FIG. 2).

When adjustments are to be made in the position of the shaft 18, the set screw 50 is loosened and thereupon the sleeve 46 can be turned. This causes its displacement in axial direction with reference to hub 45 of the bearing plate 42, and via the bearing 20 it causes an axial displacement in the same axial direction of the output shaft 18, the coupling plate 21 and the braking plate 22. Thus, the axial airgaps between coupling plate 21 and flywheel 10 on the one hand, and between braking plate 22 and braking member 66 on the other hand, can be adjusted simultaneously and in one operation. This makes possible a very simple readjustment when over a period of time the friction members 29, 32 and 39 become worn. It is also clear that in order to provide for an initial adjustment of the airgap between the flywheel 10 and the coupling plate 21, it is merely necessary to turn the sleeve 8 in the bearing plate 7 to thereby axially displace the motor shaft 3 and the flywheel 11.

Figure 5:
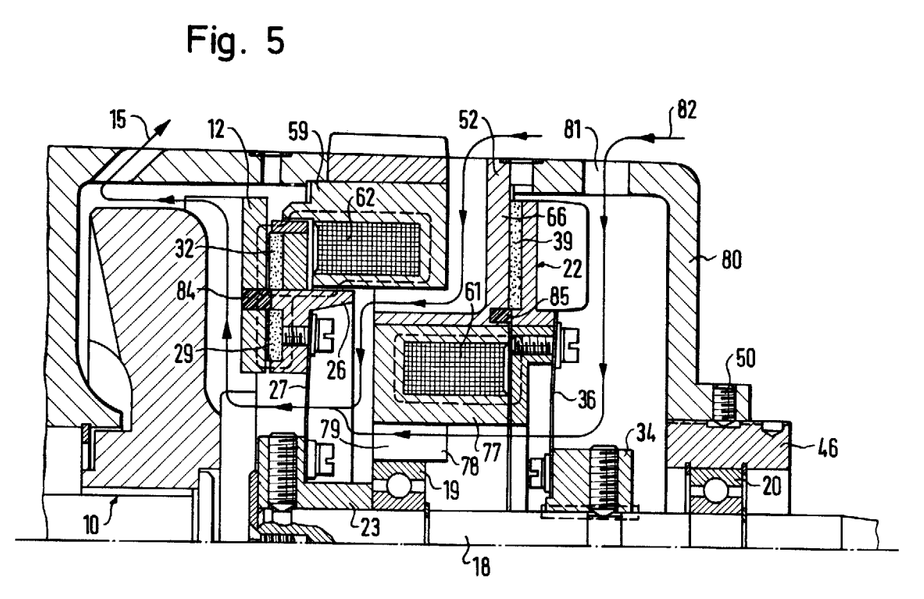
FIG. 5 is a view analogous to FIG. 2, but illustrating a further embodiment of the invention.

Coming, finally, to the embodiment in FIG. 5 it will be seen that here the construction and operation is essentially the same as in FIGS. 1–4. In place of the magnet housing 57, however, there is provided a magnet housing 77 which is provided with a plurality of vanes or fins 78 which extend radially inwardly towards the output shaft 18 and define air slots 79. Accommodated in the space surrounded by the vanes of fins 78 is the antifriction bearing 19. A bearing plate 80 is provided with air inlet openings 81 through which an additional cooling airstream 82 is aspirated by the rotating flywheel 10. This airstream 82 travels through the space between the braking plate 22 and the bearing plate 80, to pass through the openings in the spring ring 36 and to become united with the cooling airstream 15 after travelling through the slots 79. In this embodiment the vanes 40 can be omitted.

FIG. 5 shows an additional measure which can also be utilized in the embodiment of FIGS. 1–4. It will be seen that a plurality (for instance 6) projecting portions 84 of a self-lubricating synthetic plastic material, for instance polytetrafluoroethylene are mounted on or in the flywheel ring 12, projecting axially from the same towards the coupling plate and being angularly distributed. Of course, a single such member 84 could be provided, or any desired number thereof. The member or members 84 are juxtaposed with that surface portion of the armature ring 26 on which the friction member 29 is not located, and their axial length is so selected that when the motor is assembled and the winding 26 is de-energized, the free end of the respective member 84 just contacts the armature ring 26. During the first several energizations of the winding 62 the members 84 become partially worn by contact with the armature ring 26; that is, polytetrafluoroethylene of the members 84 becomes worn away and forms a thin film on the armature ring 26. Such a film, which generally will have a thickness of only severaal thousandths of a millimeter, substantially reduces the wear on the contacting faces of the members 10 and 21, and in particular it reduces the wear of the friction members 29, 32. Thus, when the plate 21 is entrained by the flywheel 10, the engagement and starting-up of the rotation of the plate 21 is particularly smooth and not jerky. As the material of the friction members 29, 32 wears away, the members 84 wear correspondingly and thus the film of polytetrafluoroethylene is constantly replenished.

Similar members, identified with reference numeral 85, are also provided in bores of the braking member 66 which are distributed circumferentially, and these members 85 engage portions of the body 38 on which the friction member 39 is not present. Their purpose and operation is the same as described above with respect to the members 84.

It will be seen that in the motor construction according to the present invention all heat-producing elements of the coupling and braking arrangement are located directly in a cooling airstream, and will thus be cooled efficiently. The various cooling air channels can readily be given a cross section that is large enough to prevent backing-up of the cooling airstream and thus improper cooling. The use of the assembly unit composed of the magnet housings and the carrier member 52 as the bearing support provides a strong two point journalling for the output shaft 18. The masses of the coupling plate 21 and the braking plate 22 are small when one considers the light-weight rings 30 and 38 and the large-surface area of the friction members which can be employed. The electromagnets 58 and 60 can be made rather large and yet the overall motor construction will be quite small. This assures strong magnetic attraction in a small-dimension motor construction. The friction surfaces of the friction members can be particularly large in the constructions according to the present invention, and this reduces the stresses on each unit of surface area and consequently the wear to which the friction members are subjected.

It will be understood that each of the elements described above, or two or more together, may also find a useful application in other types of constructions differing from the types described above.

While the invention has been illustrated and described as embodied in a motor construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omittng features that, from the standpoint of prior art, fairly constitute essential characteristics of the generic or specific aspects of this invention.

What is claimed as new and desired to be protected by letters patent is set forth in the appended claims:

1. In a motor, a combination comprising housing means; a stator mounted in said housing means, a rotor rotatable with reference to said stator, and a rotor shaft rotatable with said rotor; a flywheel mounted on and rotatable with said rotor shaft; an output shaft separate from said rotor shaft; a stationary braking member mounted in said housing means and surrounding said output shaft with clearance; a coupling plate mounted on said output shaft axially adjacent said flywheel; a braking plate mounted on said output shaft axially spaced from said coupling plate and axially adjacent said stationary braking member; a first electromagnet associated with said coupling plate and energizable for effecting frictional enagement thereof with said flywheel so as to be entrained by the latter; a second electromagnet associated with said braking plate and energizable for effecting frictional engagement with said stationary braking member so as to be braked by the same, said electromagnets being located in the space between said coupling plate and said braking plate and being axially and radially spaced from each other to define with one another a continuous air gap; and air flow producing means for producing a flow of air through said housing means and through said air gap between said electromagnets.

2. A combinationn as defined in claim 1; wherein said stationary braking member is fixedly mounted in said housing means; and wherein said electromagnets form an assembly unit with said stationary braking member, and said unit is fixedly mounted in said housing means.

3. A combination as defined in claim 1, wherein said braking member surrounds said output shaft intermediate said plates.

4. A combination as defined in claim 3, wherein said airflow-producing means comprises guide means for guiding an aspirated flow of air from the exterior of said housing means radially inwardly along said braking member, thereupon axially through said airgap between said electromagnets, then further radially inwardly along said coupling plate, axially through said coupling plate and finally radially outwardly and to the exterior of said housing means along said flywheel.

5. A combination as defined in claim 2; further comprising an outer bearing plate mounted on and constituting part of ssaid housing means; and wherein said braking member is mounted on said bearing plate.

6. A combination as defined in claim 2; and further comprising a plurality of bearings which journal said output shaft for rotation, at least one of said bearings being mounted in said assembly unit.

7. A combination as defined in claim 6, wherein said assembly unit surrounds a central opening through which said output shaft extends, said assembly unit having a plurality of angularly spaced fins which extend radially inwardly of said central opening; and wherein said one bearing is located in said central opening and carries said fins.

8. A combination as defined in claim 6, wherein said assembly unit surrounds a central opening through which said output shaft extends; and wherein said one bearing surrounds and journals said output shaft within said central opening.

9. A combination as defined in claim 2, wherein said electromagnets and braking member are shrink-fitted together to form said assembly unit.

10. A combination as defined in claim 3, wherein said braking plate has an axial end facing away from said braking member and being provided with a plurality of impeller vanes for producing an additional airflow.

11. A combination as defined in claim 1, said flywheel including a body having an axial end facing said coupling plate and provided with a plurality of ribs forming between themselves air slots, and a ring of magnetically conductive material mounted on said ribs.

12. A combination as defined in claim 1, said housing means having inlet and outlet openings for said airflow; and further comprising impeller means mounted on and rotatable with said motor shaft, said impeller means being operative for producing an airstream which sweeps over said openings so as to block the entry of contaminants through the same.

13. A combination as defined in claim 1, said coupling plate and braking plate each having a hub surrounding said output shaft, an armature ring of magnetically conductive material adjacent the associated electromagnet, and a flexible air-passage-forming spring member connecting said hub with said armature ring.

14. A combination as defined in claim 13; and further comprising an annular reinforcing member of lightweight material surrounding and fast with the respective armature ring and having an axial endface provided with a friction-material component.

15. A combination as defined in claim 14, wherein said reinforcing members are of light-weight metal.

16. A combination as defined in claim 14, wherein said reinforcing members are of synthetic plastic material.

17. A combination as defined in claim 14, wherein said reinforcing members are shrink-fitted onto the respectively associated aarmature rings.

18. A combination as defined in claim 14, wherein said reinforcing member of said coupling plate is surrounded by a ring of magnetically conductive material.

19. A combination as defined in claim 18, wherein said armature ring of said coupling plate and said ring of magnetically conductive material are constructed and arranged for subdividing the magnetic field produced by energization of said first electromagnet into three field components.

20. A combination as defined in claim 3, wherein said output shaft has limited freedom of axial displacement in said housing means, so that said coupling plate and said braking plate change their positions simultaneously in response to such displacement and with reference to said flywheel and braking member, respectively.

21. A combination as defined in claim 20; further comprising a bearing plate in said housing means and having a tapped opening; and a threaded sleeve threaded with said opening and surrounding a portion of said output shaft, said sleeve being axially displaceable with reference to said opening by requisite turning and cooperating with said output shaft for thereby effecting said axial displacement of the same.

22. A combination as defined in claim 1, wherein said motor shaft has limited freedom of axial displacement in said housing means.

23. A combination as defined in claim 22; furthei comprising a bearing plate in said housing means and having a tapped opening; and a threaded sleeve threaded with said opening and surrounding a portion of said motor shaft, said sleeve being axially displaceable with reference to said opening by requisite turning and cooperating with said motor shaft for thereby effecting said axial displacement of the same.

24. A combination as defined in claim 1, said flywheel and said braking member each having an axial endface adapted to be engaged by said coupling plate and said braking plate, respectively; and further comprising at least one insert of self-lubricating material projecting from at least one of said axial endfaces and adapted to contact the respectively cooperating plate.

* * * * *